United States Patent [19] [11] 3,875,779
Pugh et al. [45] Apr. 8, 1975

[54] FORMING OF MATERIALS

[75] Inventors: Stuart Pugh; Douglas Gordon Smith, both of Loughborough; Brian Neil Manton, Sandiacre; Graham Frederick Whittaker, Washingborough, all of England

[73] Assignee: British Ropes Limited, Doncaster, Yorkshire, England

[22] Filed: Nov. 19, 1973

[21] Appl. No.: 416,825

[30] Foreign Application Priority Data
Nov. 21, 1972 United Kingdom............ 53839/72

[52] U.S. Cl. .................... 72/69; 72/262; 72/342; 72/364
[51] Int. Cl. ......................................... B21b 27/06
[58] Field of Search ............ 72/342, 364, 262, 266, 72/84, 69, 254, 253; 425/402, 381

[56] References Cited
UNITED STATES PATENTS

| | | |
|---|---|---|
| 2,367,394 | 1/1945 | Griffiths .............................. 72/262 |
| 3,161,756 | 12/1964 | Haverkamp ........................ 72/253 |
| 3,198,926 | 8/1965 | Melmoth ............................ 72/364 |
| 3,695,081 | 10/1972 | Gartner .............................. 72/254 |

Primary Examiner—C. W. Lanham
Assistant Examiner—Robert M. Rogers
Attorney, Agent, or Firm—Morgan, Finnegan, Durham & Pine

[57] ABSTRACT

Method and apparatus for producing from a workpiece, such as a billet, product of reduced cross section, such as wire. A load pattern is applied to the workpiece which induces compressive stresses at a localised region of the workpiece at an orifice defining the product cross section. Heat is applied to the workpiece at a localised region adjacent the orifice. The compressive stresses and heat applied are such that the material of the workpiece is caused to flow through the orifice.

8 Claims, 2 Drawing Figures

FORMING OF MATERIALS

The invention relates to the forming of materials and in particular relates to the forming of a product of reduced cross section from a workpiece by an extrusion process.

According to one aspect of the invention a method of producing from a workpiece a product of reduced cross section comprises applying a load pattern which induces compressive stresses at localised region of the workpiece at an orifice defining the product cross section and applying heat to the workpiece at a localised region adjacent the orifice the compressive stresses and the heat applied being such as to cause the material of the workpiece to flow through the orifice.

Preferably the heat is applied by a tungsten inert gas torch.

Compressive stresses may be induced by applying an axial load between a billet which may be tubular comprising the workpiece and a die head containing the orifice and by rotating the billet relative to the die head.

According to a further aspect of the invention there is provided an apparatus for producing from a workpiece a product of reduced cross section comprising means for applying a load pattern which induces compressive stresses at a localised region of the workpiece at an orifice which is to define the product cross section and means for applying heat at a localised region of the workpiece adjacent the orifice.

Preferably the means for applying heat comprises a tungsten inert gas torch.

The means for inducing compressive stresses may comprise means for applying an axial load between a billet which may be tubular comprising the workpiece and a die head containing the orifice, the billet being mountable for rotation relative to the die head.

According to a further aspect of the invention there is provided an apparatus for producing from a workpiece a product of reduced cross section comprising means for rotatably mounting a billet, which may be tubular, comprising the workpiece, relative to a die head, means for applying an axial load between the billet and the die head, means for applying heat to a localised region of the billet at the die head, the arrangement being such that, in use, the material of the billet is formed through an orifice in the die head.

The foregoing and further features of the invention may be more readily understood from the following description of a preferred embodiment thereof, by way of example, with reference to the accompanying drawings, in which.

Figure 1:
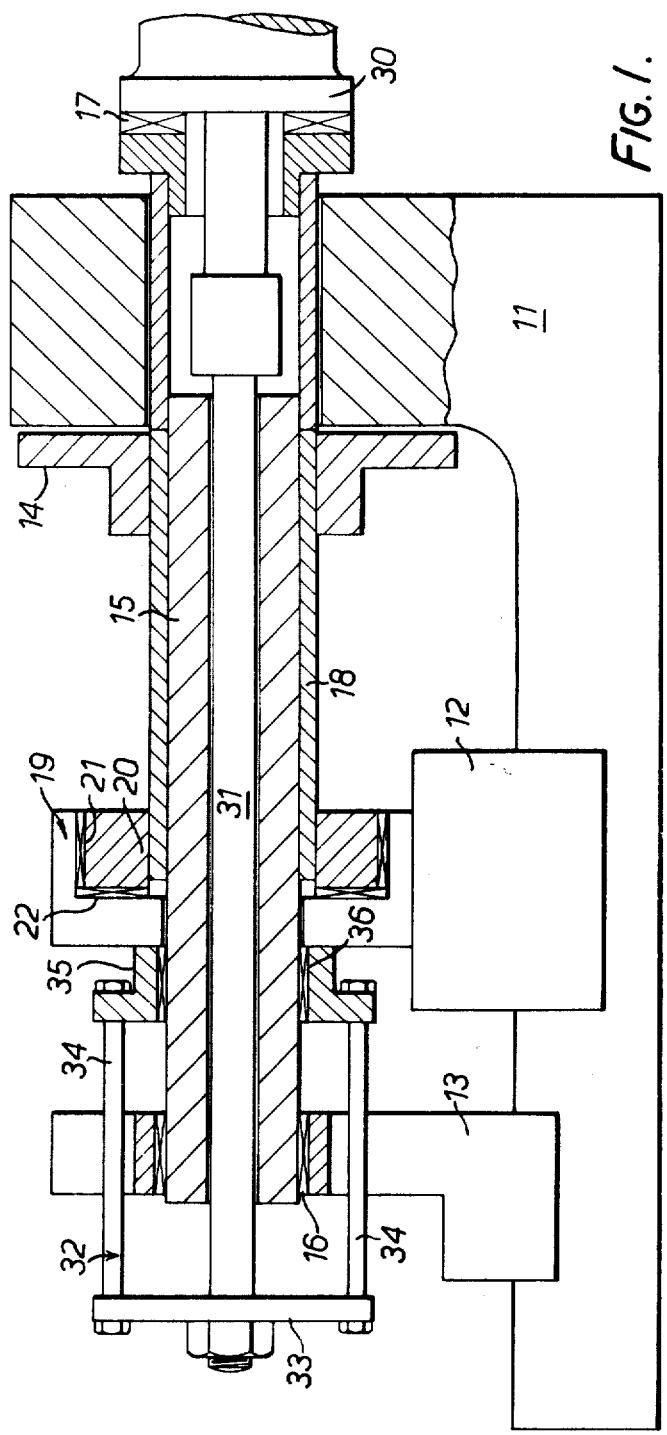
FIG. 1 is a side sectional view of an apparatus for extruding a workpiece.

Referring firstly to FIG. 1 the apparatus comprises a centre lathe comprising a headstock 11, a saddle 12, a work steady 13 and a chuck 14. A tubular mandrel 15 is rotatably mounted between the work steady, by a bearing 16, and the headstock 11, by a thrust bearing 17. A workpiece, comprising a tubular billet 18, is located around the mandrel 15 and held in the chuck 14 to rotate therewith.

Figure 2:
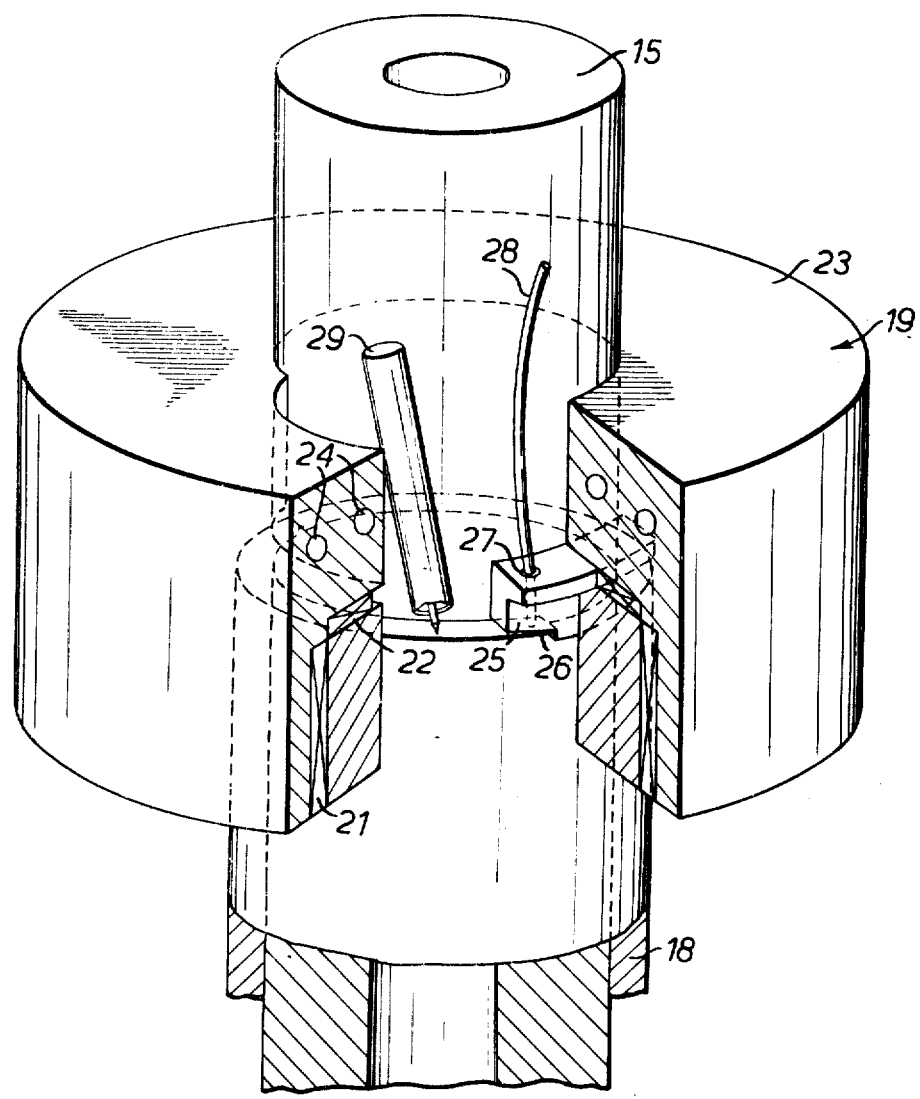
FIG. 2 is a perspective view, part cut away, of a part of the apparatus of FIG. 1.

The saddle 12 carries a die head 19 including a support ring 20 which surrounds one end of the billet 18 and rotates therewith by virtue of its mounting by a radial bearing 21 and a thrust bearing 22. The die head 19 comprises a main annular member 23 (FIG. 2) attached to saddle 12 and carrying bearings 21 and 22. Cooling passages 24 are formed in member 23 and coolant is passed through these, in use. A die segment 25 (FIG. 2) is carried by member 23 and has a profiled portion 26 arranged to abut the end of billet 18. The die segment 25 is formed with an orifice 27 through which the product 28 is extruded. The member 23 is formed with a cut-out portion to enable the product 28 to feed away from die segment 25 and to accommodate a tungsten inert gas torch 29 which is located so as to heat the billet 18 locally adjacent the die segment 25.

An hydraulic ram 30 is mounted at the side of the headstock 11 remote from chuck 14. The hydraulic ram 30 is connected by a pull rod 31 to a thrust assembly 32 which comprises a back plate 33, attached to the pull rod 31. The back plate 33 is attached by bolts 34 to an annular thrust member 35 which acts on die head 19. The member 35 carries a bearing 36 which provides additional support for the mandrel 15.

In use the billet 18 is rotated, together with mandrel 15, by the chuck 14. The hydraulic ram 30 is actuated so as to pull the die head 19 towards billet 18, via pull rod 31 and thrust assembly 32, and so set up compressive stress in billet 18. The torch 29 is actuated to heat the billet 18 at a position immediately prior to abutment with portion 26 and the material of the billet 18 is extruded through orifice 27.

A prototype machine as illustrated and described above has been built and tested and it has been found possible to produce wire having a diameter of from 0.04 to 0.10 inches diameter from a copper billet having 4 inches outside diameter, 3 inches inside diameter and 18 inches long, utilising an axial load of 15 tons.

Typical results for producing 0.10 inches diameter copper wire from a sand cast copper billet of 4 inches outside diameter and 3 inches inside diameter are given in the table below:

| Billet Rotation (R.P.M.) | Axial Load (TONS) | Temp (°C) | Torque (TON.IN.) |
| --- | --- | --- | --- |
| 34.5 | 11 | 460 | 20 |
| 34.5 | 4 | 675 | 16 |

The apparatus illustrated is merely an example of an apparatus for performing the extrusion process and could be altered and modified in many ways. In practice the best arrangement includes a non-rotatable die head, a rotatable billet and the torch is fixed with respect to the die head. However, the remaining parts of the apparatus may have alternative arrangement as follows:

1. The mandrel is fixed axially but is rotated, the billet is fixed axially, the support ring is rotated and the die head is moved axially.
2. The mandrel is moved axially and is rotated, and other conditions as for (1) above.
3. The mandrel is fixed axially and non-rotatable and other conditions as for (1) above.
4, 5 and 6. Conditions as for (1), (2) and (3) above, respectively but with the support ring fixed.
7. The mandrel is fixed axially but is rotated, the billet is moved axially, the support ring is rotated and the die head is fixed axially.
8. The mandrel is moved axially and rotated, and other conditions as for (7) above.

9. The mandrel is fixed axially and is non-rotatable, and other conditions as for (7) above.

10, 11, 12. Conditions as for (7), (8) and (9) above, respectively but with the support ring fixed.

In all of these arrangements there may be more than one die segment and the or each die segment may have one or more orifices formed therein. Each die segment may have a separate inert gas torch associated therewith around the circumference of the end surface of the billet, in use.

We claim:

1. A method of producing from a workpiece a product of reduced cross section comprising applying a load pattern which induces compressive stresses at a localised region of the workpiece at an orifice defining the product cross section and applying heat to the workpiece at only a localised region adjacent the orifice, the compressive stresses and the heat applied being such as to cause the material of the workpiece to flow through the orifice.

2. A method as claimed in claim 1 wherein the heat is applied by directing a tungsten inert gas torch against the workpiece.

3. A method as claimed in claim 1 wherein the compressive stresses are induced by applying an axial load between a billet comprising the workpiece and a die head containing the orifice and by rotating the billet relative to the diehead.

4. Apparatus for producing from a workpiece a product of reduced cross section comprising: means defining an orifice adapted to form said product cross section; means for applying a load pattern which induces compressive stresses at a localised region of the workpiece at said orifice; and means for applying heat at only a localised region of the workpiece adjacent the orifice.

5. Apparatus as claimed in claim 4 wherein the means for applying heat comprises a tungsten inert gas torch.

6. Apparatus as claimed in claim 4 wherein the means for inducing compressive stresses comprises means for applying an axial load between a billet comprising the workpiece and a die head containing the orifice, the billet being mountable for rotation relative to the die head.

7. Apparatus as claimed in claim 6 wherein the billet is tubular and is mounted on a mandrel for rotation relative to the die head.

8. Apparatus as claimed in claim 6 wherein the means for applying an axial load includes a hydraulic ram.

* * * * *